(12) United States Patent
Krause et al.

(10) Patent No.: US 9,038,793 B2
(45) Date of Patent: May 26, 2015

(54) CENTRIFUGAL PENDULUM DEVICE

(71) Applicant: Schaeffler Technologies AG & Co. KG, Herzogenaurach, DE (US)

(72) Inventors: Thorsten Krause, Buehl (DE); Kai Schenck, Offenburg (DE); Stephan Maienschein, Baden-Baden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 119 days.

(21) Appl. No.: 13/764,171

(22) Filed: Feb. 11, 2013

(65) Prior Publication Data
US 2013/0150169 A1    Jun. 13, 2013

Related U.S. Application Data

(63) Continuation of application No. PCT/DE2011/001058, filed on May 11, 2011.

(30) Foreign Application Priority Data

Aug. 19, 2010  (DE) .......................... 10 2010 034808
Mar. 31, 2011  (DE) .......................... 10 2011 015752

(51) Int. Cl.
*F16F 15/14*      (2006.01)
*F16D 3/12*       (2006.01)

(52) U.S. Cl.
CPC ................ *F16F 15/145* (2013.01); *F16D 3/12* (2013.01)

(58) Field of Classification Search
CPC .............. F16H 2045/0263; F16F 15/14; F16F 15/1407; F16F 15/145; F16F 15/1457
USPC ............. 188/290, 296, 378; 74/574.2, 572.2; 464/68.2, 180; 192/55.4, 208
See application file for complete search history.

(56) References Cited

FOREIGN PATENT DOCUMENTS

| CN | 1896560 | 1/2007 |
|---|---|---|
| CN | 1955502 | 5/2007 |
| DE | 102006028556 | 1/2007 |
| DE | 102006028552 | 5/2007 |
| DE | 102007024115 | * 12/2007 |
| DE | 102009030971 | 1/2010 |
| DE | 102009042836 | 5/2010 |
| WO | 2010127663 | 11/2010 |
| WO | 2011076169 | 6/2011 |

* cited by examiner

*Primary Examiner* — Vishal Sahni
(74) *Attorney, Agent, or Firm* — Simpson & Simpson, PLLC

(57) ABSTRACT

Centrifugal pendulum device including pendulum masses arranged on axial sides of a pendulum mass support rotatable about an axis of rotation to form a pendulum mass pair. To form the mass pair, the masses are fastened to each other by means of a fastener passing through a cutout in the mass support. The mass pair is pivotable relative to the mass support due to a rolling element arranged to roll in a recess of the mass support and of the mass. In a section axially covering the recess of the mass support, the rolling element has a first outer diameter. In a section axially covering the recess of the pendulum mass, the rolling element has a second outer diameter. The rolling element further comprises a section axially located between the first and second diameters and has a third diameter, which is smaller than or equal to the first outer diameter.

9 Claims, 4 Drawing Sheets

CENTRIFUGAL PENDULUM DEVICE

CROSS-REFERENCE TO RELATED APPLICATIONS

This patent issued from an application filed under 35 U.S.C. §120 and §365(c) as a continuation of International Patent Application No. PCT/DE2011/001058 filed May 11, 2011, which application claims priority from German Patent Application Nos. 10 2010 034 808.2, filed Aug. 19, 2010 and 10 2011 015 752.2, filed Mar. 31, 2011, which applications are incorporated herein by reference in their entireties.

TECHNICAL FIELD

The invention relates generally to a centrifugal pendulum device, and, more specifically, to a centrifugal pendulum device arranged in a drive train of a motor vehicle.

BACKGROUND

Published German Patent Application DE 10 2006 028 556 A1 discloses a torsional vibration damper arranged in a drive train of a motor vehicle. The torsional vibration damper is provided to transmit a torque introduced on a drive side, for example, by a combustion engine to a power take-off side, for example a transmission, and may additionally contribute to damping torsional vibrations that may be created by the combustion engine. For this purpose, the torsional vibration damper includes a damper input piece and a damper output piece. The damper output piece is rotatable to a limited extent relative to the damper input piece due to the action of at least one energy storage element.

The torsional vibration damper furthermore comprises a centrifugal pendulum device for further damping and/or absorption of the torsional vibrations in the drive train. The centrifugal pendulum device comprises a pendulum mass support arranged to rotate about an axis of rotation and at least one pendulum mass pair arranged thereon. The pendulum mass pair consists of two pendulum masses arranged opposite each other on both axial sides of the pendulum mass support and connected by fasteners respectively passing through cutouts in the pendulum mass support.

Two rolling elements cause the pendulum mass pair to be pivotable to a limited extent relative to the pendulum mass support. Each rolling element is received to roll in a respective recess formed in the pendulum mass support and in the pendulum mass. In a first section that axially covers the recess formed in the pendulum mass support, the rolling element has a first outer diameter. In a second section axially covering the recess of the pendulum mass, the rolling element has a second outer diameter.

In a third section axially located between the first section and the second section, the rolling element has a collar that tapers in a radially outward direction. This collar prevents the pendulum mass from getting into contact with the pendulum mass support. For this purpose, a collar of this type is provided on the rolling element on each axial side of the pendulum mass support.

SUMMARY

The present invention broadly comprises a centrifugal pendulum device comprising pendulum masses arranged on both axial sides of a pendulum mass support rotatable about an axis of rotation to form a pendulum mass pair; a fastener passing through a cutout formed in the pendulum mass support to fasten the pendulum masses to each other to form the pendulum mass pair; and, a rolling element arranged to roll in a recess formed in the pendulum mass support and in the pendulum mass to allow the pendulum mass pair to pivot to a limited extent relative to the pendulum mass support, the rolling element having a first outer diameter in a first section axially covering the recess of the pendulum mass support and a second outer diameter in a second section axially covering the recess of the pendulum mass; wherein the rolling element has a third section axially located between the first outer diameter and the second outer diameter and having a third outer diameter, the third diameter being smaller than or equal to the first outer diameter.

An object of the invention is to improve the guiding of a pendulum mass on a pendulum mass support. A further object is to reduce the manufacturing costs of a centrifugal pendulum device of this type.

Accordingly, the invention proposes a centrifugal pendulum device comprising pendulum masses arranged on both axial sides of a pendulum mass support, the pendulum mass support being rotatable about an axis of rotation, a fastener for fastening the pendulum masses to each other to form the pendulum mass pair, the fastener passing through a cutout in the pendulum mass support, and a rolling element for causing the pendulum mass pair to be pivotable relative to the pendulum mass support to a limited extent, the rolling element being arranged to roll in a recess in the pendulum mass support and in the pendulum mass, wherein in a first section axially covering the recess of the pendulum mass support, the rolling element has a first outer diameter and in a second section axially covering the recess of the pendulum mass, the rolling element has a second outer diameter. The rolling element has a third section that is axially located between the first outer diameter and the second outer diameter and has a third outer diameter, the third outer diameter being smaller than or equal to the first outer diameter. This may result in improved guiding of the pendulum mass in the pendulum mass support, at the same time reducing the manufacturing costs for the rolling element.

In a preferred embodiment of the invention, the first outer diameter is greater than the second outer diameter. The first outer diameter may also be smaller or equal to the second outer diameter.

Also in a preferred embodiment, a spacer element for limiting an axial minimum distance between the pendulum mass support and the pendulum mass is formed on a pendulum mass side face axially facing the pendulum mass support. Preferably, the spacer element is a pin that is in particular formed as an integral part of the pendulum mass. The spacer element may also be a separate component fixed to the pendulum mass, for example riveted, welded, glued, soldered, screwed or press-fitted thereto.

The invention further includes a torsional vibration damper comprising a damper input piece, a damper output piece rotatable to a limited extent relative to the damper input piece due to the action of energy storage elements, and a centrifugal pendulum device in accordance with one of the features described above arranged on the damper input piece and/or on the damper output piece.

In a preferred embodiment, a further intermediate damper piece is effectively received between the damper input piece to be rotatable to a limited extent relative to the damper input piece and to the damper output piece, and the centrifugal pendulum device in accordance with one of the preceding features is arranged on the intermediate damper piece.

In general, the centrifugal pendulum device may be arranged on and/or in a hydrodynamic torque converter, on and/or in a clutch device such as a wet-running clutch, on and/or in a double clutch device, on a dual-mass flywheel or a torsional vibration damper.

BRIEF DESCRIPTION OF THE DRAWINGS

Further advantages and advantageous embodiments of the invention will become apparent from the description and the figures which are not drawn to scale for reasons of clarity. All features explained herein are applicable not only in the described combination, but also in other combinations and separately without departing from the scope of the present invention. The invention will be described in more detail below with reference to the drawings, wherein.

DETAILED DESCRIPTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspect. The present invention is intended to include various modifications and equivalent arrangements within the spirit and scope of the appended claims.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
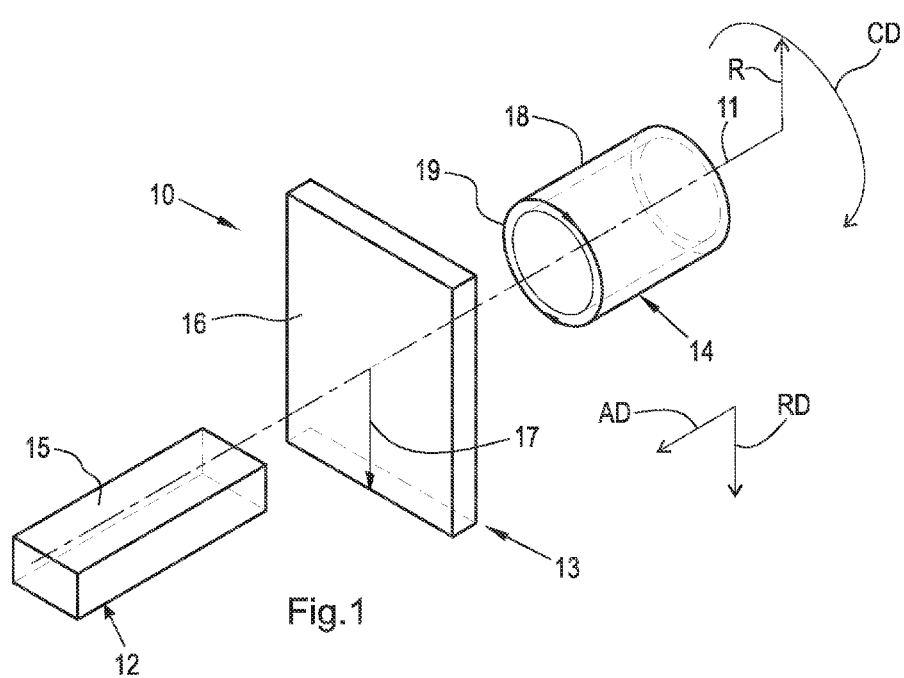
FIG. 1 is a side view of a specific embodiment of the centrifugal pendulum device of the invention.

Referring now to the Figures, FIG. 1 is a side view of an embodiment of a centrifugal pendulum device 10 of the invention. Centrifugal pendulum device 10 comprises pendulum mass support 12 that is rotatable about axis of rotation 100 and includes spring windows 14 formed in a radially inward region to receive energy storage elements (not shown) such as coil springs. The energy storage elements are in operative connection with pendulum mass support 12 and a (non-illustrated) further damper component of a torsional vibration damper to allow the damper component to rotate relative to pendulum mass support 12 under the effect of the energy storage elements.

Power take-off hub 16 is mounted, in particular, riveted, to pendulum mass support 12 radially inside spring windows 14.

Spline 18 is provided to connect power take-off hub 16 to a transmission input shaft so as to be fixed against rotation relative thereto.

Four pendulum masses 20 are arranged radially to the outside of pendulum mass support 12. The four pendulum masses 20 are connected to (non-illustrated) pendulum masses arranged axially opposite on the other axial side of pendulum mass support 12 to form four pendulum mass pairs 24. Three fasteners 24 are provided for each pendulum mass pair. The fasteners are securely connected to pendulum masses 20 and pass through cutouts 26 in pendulum mass support 12. Cutouts 26 are shaped to allow pendulum masses 20 to pivot relative to pendulum mass support 12 along a pendulum track. In particular, cutouts 26 are of arcuate shape.

The actual pivoting movement of pendulum masses 20 relative to pendulum mass support 12 is made possible by rolling elements 28 and recesses 30, 32 correspondingly formed in pendulum mass support 12 and in pendulum masses 20. For this purpose, two rolling elements 28 such as rolling bodies, in particular step pins, are provided for each pendulum mass pair 22 in the respective recesses. Recesses 32 in pendulum masses 20 of pendulum mass pair 22 complement the recesses in pendulum mass support 12. In particular, recess 30 in pendulum mass support 12 is kidney-shaped, and recess 32 in pendulum masses 20 is inversely bent.

Figure 2:
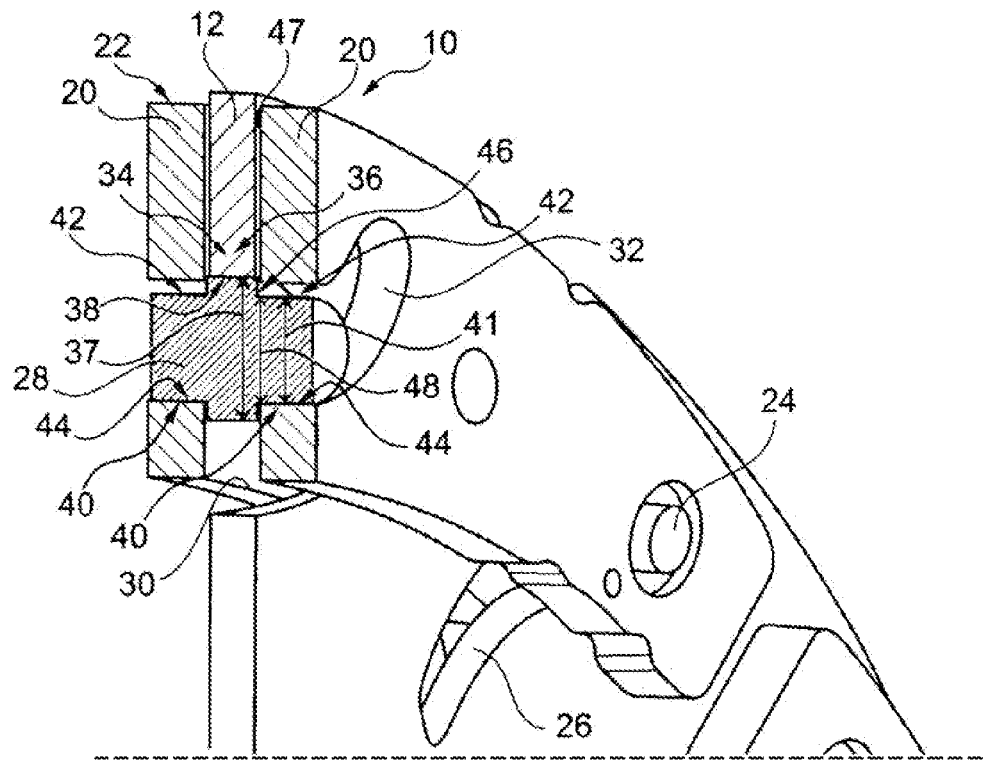
FIG. 2 is a three-dimensional cross-sectional view of a section A of the centrifugal pendulum device shown in FIG. 1.

FIG. 2 is a three-dimensional cross-sectional view of section A of centrifugal pendulum device 10 shown in FIG. 1. In first axial section 34, which is axially covered by pendulum mass support 12 or by recess 30 in pendulum mass support 12, rolling element 28 has outer surface 36, in particular of cylindrical shape, which, in particular, has a constant first outer diameter 37, on which rolling element 28 may roll along inner surface 38 of recess 30 formed in pendulum mass support 12. Moreover, outer surface 40, which preferably is likewise cylindrical and preferably likewise has a constant second outer diameter 41, is provided in second section 42 axially adjacent to first section 34 and axially covered by pendulum mass 20 or by the recess 32 in pendulum mass 20. Due to outer surface 40, the rolling element 28 may rotate relative to inner surface 44 of pendulum mass 20. The rolling movement in connection with the contour of inner surfaces 38, 44 and with the contour of outer surfaces 36, 40 of the rolling element allows pendulum mass 20 to pivot relative to pendulum mass support 12 along a pendulum track, which is preferably of arcuate shape or at least partly of arcuate shape.

In third section 46 axially located between first section 34 and second section 42 and preferably extending over the axial width of axial gap 47 formed between pendulum mass 20 and pendulum mass support 12, the rolling element has third outer diameter 48, which is identical with first outer diameter 37 and greater than second outer diameter 41.

Figure 3:
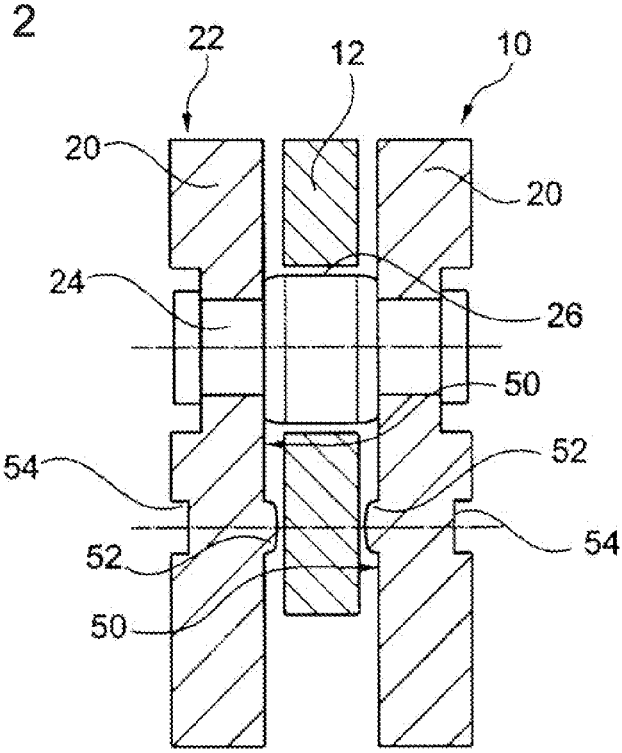
FIG. 3 is a cross-sectional view of a section B of the centrifugal pendulum device shown in FIG. 1.

FIG. 3 is a cross-sectional view of section B of centrifugal pendulum device 10 shown in FIG. 1. Fastener 24 is a step pin having at least two different outer diameters and is securely connected to two pendulum masses 20 arranged on both axial sides of pendulum mass support 12 to form pendulum mass pair 22. For example, fastener 24 is welded, riveted, screwed, glued, soldered, or press-fitted to the pendulum masses.

In a region located radially inside fastener 24, spacer element 52 is formed on pendulum mass side face 50 axially facing pendulum mass support 12. Spacer element 52 limits an axial minimum distance between pendulum mass support 12 and pendulum mass 20. In particular, the spacer element is a pin and integrally formed on pendulum mass 20, for example in an embossing process, which results in depression 54 formed on the axially opposite side of pendulum mass 54.

Figure 4:
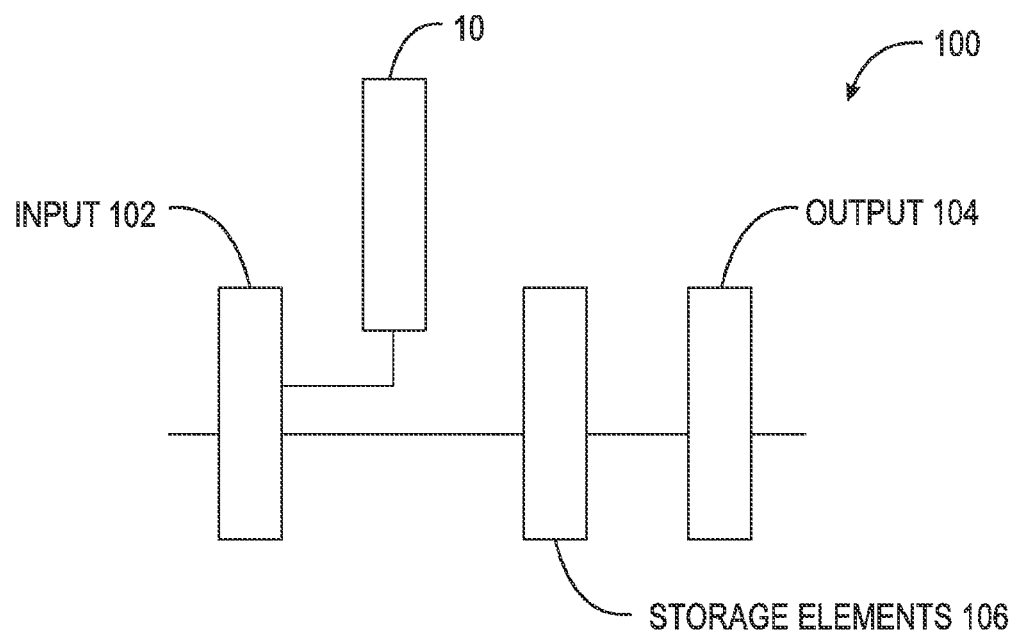
FIG. 4 is a schematic block diagram of a torsional vibration damper with a centrifugal pendulum device of FIGS. 1 and 2.

FIG. 4 is a schematic block diagram of torsional vibration damper 100 with a centrifugal pendulum device of FIGS. 1 and 2 arranged on a damper input piece. Torsional vibration damper 100 includes damper input piece 102, damper output piece 104, and energy storage elements 106. Damper output piece 106 is rotatable to a limited extent relative to damper input piece 102 due to the action of energy storage elements 106. Centrifugal pendulum device 10 as shown in FIGS. 1 and 3 is arranged on damper input piece 102.

Figure 5:
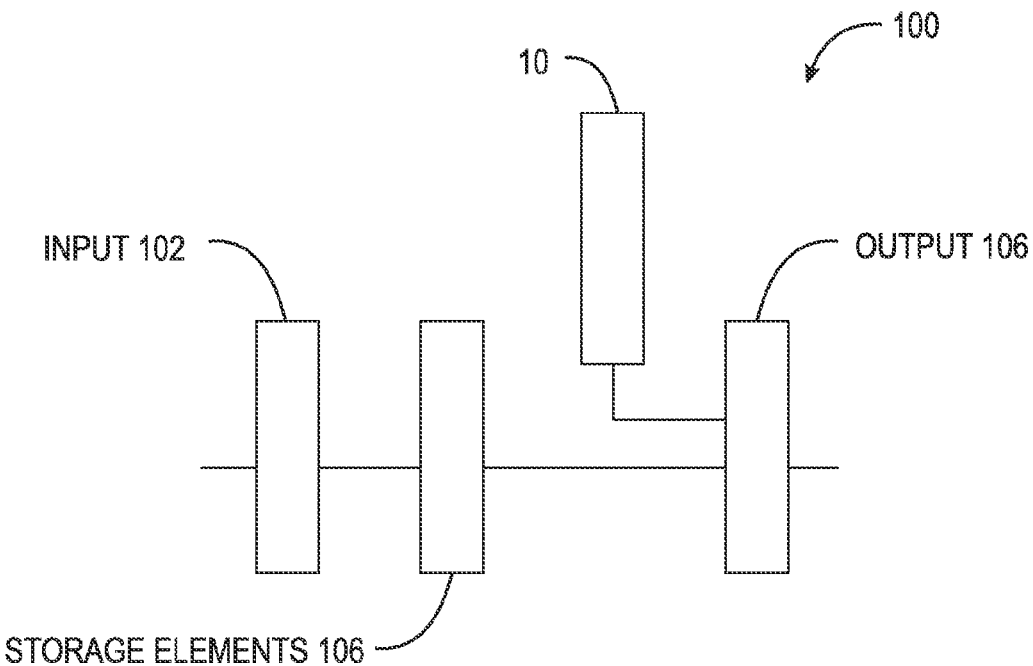
FIG. 5 is a schematic block diagram of a torsional vibration damper with a centrifugal pendulum device of FIGS. 1 and 2; and, FIG. 6 is a schematic block diagram of a torsional vibration damper with a centrifugal pendulum device of FIGS. 1 and 4.

FIG. 5 is a schematic block diagram of torsional vibration damper 100 with a centrifugal pendulum device of FIGS. 1 and 2 arranged on a damper output piece. Torsional vibration damper 100 includes damper input piece 102, damper output piece 104, and energy storage elements 106. Damper output piece 106 is rotatable to a limited extent relative to damper input piece 102 due to the action of energy storage elements 106. Centrifugal pendulum device 10 as shown in FIGS. 1 and 3 is arranged on damper output piece 104.

Figure 6:
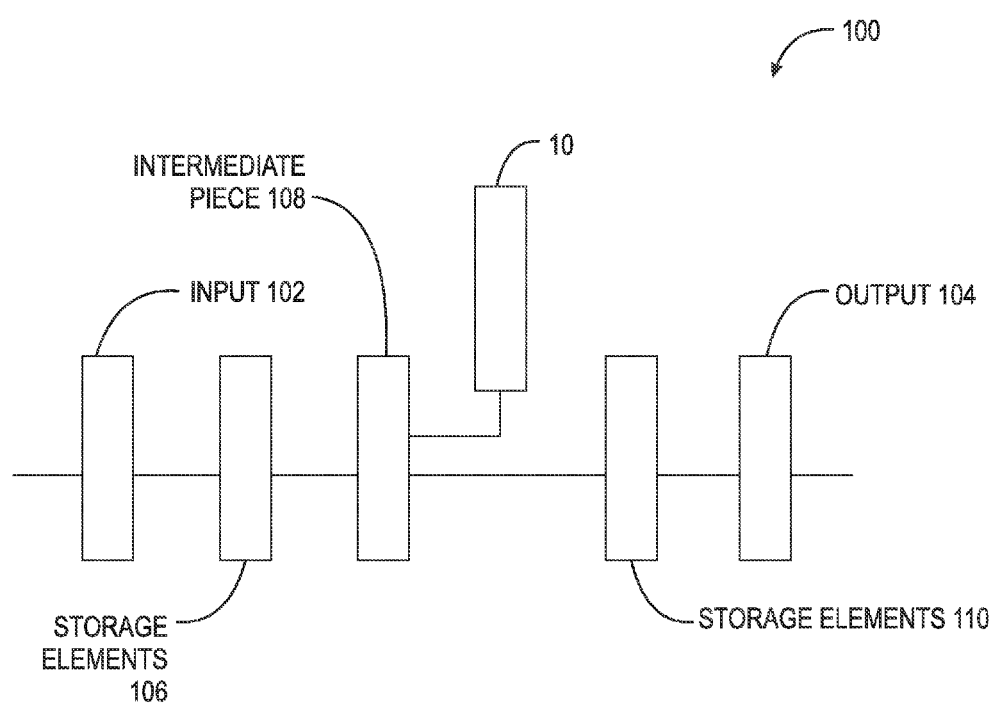

FIG. 6 is a schematic block diagram of a torsional vibration damper with a centrifugal pendulum device of FIGS. 1 and 4. Torsional vibration damper 100 includes damper input piece 102, damper output piece 104, and energy storage elements 106. Damper 100 includes intermediate piece 108 and energy storage elements 110. Intermediate piece 106 is rotatable to a limited extent relative to damper input piece 102 due to the action of energy storage elements 106 and intermediate piece 106 is rotatable to a limited extent relative to damper output piece 104 due to the action of energy storage elements 110. Centrifugal pendulum device 10 as shown in FIGS. 1 and 4 is arranged on intermediate piece 108.

LIST OF REFERENCE NUMERALS 10 centrifugal pendulum device
12 pendulum mass support
14 spring window
16 power take-off hub
18 spline
20 pendulum mass
22 pendulum mass pair
24 fastener
26 cutout
28 rolling element
30 recess
32 recess
34 section
36 outer surface
37 outer diameter
38 inner surface
40 outer surface
41 outer diameter
42 section
44 inner surface
46 section
48 outer diameter
50 side face
52 spacer element
54 depression
100 axis of rotation

What is claimed is:

1. A centrifugal pendulum device (10), comprising:
   first and second pendulum masses (20) arranged on both axial sides of a pendulum mass support (12) rotatable about an axis of rotation (100) to form a pendulum mass pair (22);
   a fastener (24) passing through a cutout (26) formed in the pendulum mass support (12) to fasten the first and second pendulum masses (20) to each other to form the pendulum mass pair (22); and,
   a rolling element (28) arranged to roll in a first recess (30) formed in the pendulum mass support (12) and in a second recess (32) formed in the first pendulum mass (20) to allow the pendulum mass pair (22) to pivot relative to the pendulum mass support (12), the rolling element (28) having a first outer diameter (37) in a first section (34) located within the first recess (30) of the pendulum mass support (12) and a second outer diameter (41) in a second section (42) located within the second recess (32) of the first pendulum mass (20);
   wherein the rolling element (28) has a third section (46) axially located between the first outer diameter and the second outer diameter and having a third outer diameter (48), the third diameter being smaller than the first outer diameter (37).

2. The centrifugal pendulum device (10) recited in claim 1, wherein the first outer diameter (37) is greater than the second outer diameter (41).

3. The centrifugal pendulum device (10) recited in claim 1, wherein a spacer element (52) for limiting an axial minimum distance between the pendulum mass support (12) and the pendulum mass (20) is formed on a pendulum mass (20) side face (50) axially facing the pendulum mass support (12) to limit an axial minimum distance between the pendulum mass support (12) and the pendulum mass (20).

4. The centrifugal pendulum device (10) recited in claim 3, wherein the spacer element (52) is a pin.

5. The centrifugal pendulum device (10) recited in claim 3, wherein the spacer element (52) is formed integrally with the pendulum mass (20).

6. The centrifugal pendulum device (10) recited in claim 3, wherein the spacer element (52) is fixed to the pendulum mass (20) as a separate component.

7. The centrifugal pendulum device (10) recited in claim 6, wherein the spacer element (52) and the pendulum mass (20) are riveted or welded or glued or soldered or screwed or splined together.

8. A torsional vibration damper, comprising:
   a damper input piece;
   a damper output piece rotatable to a limited extent relative to the damper input piece due to the action of energy storage elements; and,
   a centrifugal pendulum device arranged on the damper input piece and/or on the damper output piece, the centrifugal pendulum device comprising:
   first and second pendulum masses (20) arranged on both axial sides of a pendulum mass support (12) rotatable about an axis of rotation (100) to form a pendulum mass pair (22);
   a fastener (24) passing through a cutout (26) formed in the pendulum mass support (12) to fasten the first and second pendulum masses (20) to each other to form the pendulum mass pair (22); and,
   a rolling element (28) arranged to roll in a first recess (30) formed in the pendulum mass support (12) and in a second recess (32) formed in the first pendulum mass (20) to allow the pendulum mass pair (22) to pivot relative to the pendulum mass support (12), the rolling element (28) having a first outer diameter (37) in a first section (34) located within the first recess (30) of the pendulum mass support (12) and a second outer diameter (41) in a second section (42) located within the second recess (32) of the first pendulum mass (20);

wherein:
the rolling element (28) has a third section (46):
axially located between the first and second portions in a direction parallel to the axis of rotation; and,
having a third outer diameter (48); and,
the third outer diameter is smaller than the first outer diameter (37).

9. A torsional vibration damper, comprising:

a damper input piece;

a damper output piece;

an intermediate damper piece between the damper input piece and the damper output piece and rotatable to a limited extent relative to:
the damper input piece due to the action of first energy storage elements; and the damper output piece due to the action of second energy storage elements and wherein a centrifugal pendulum device is arranged on the intermediate damper piece, the centrifugal pendulum device comprising:
pendulum masses (20) arranged on both axial sides of a pendulum mass support (12) rotatable about an axis of rotation (100) to form a pendulum mass pair (22);
a fastener (24) passing through a cutout (26) formed in the pendulum mass support (12) to fasten the pendulum masses (20) to each other to form the pendulum mass pair (22); and,
a rolling element (28):
arranged to roll in a recess (30, 32) formed in the pendulum mass support (12) and in the pendulum mass (20) to allow the pendulum mass pair (22) to pivot to a limited extent relative to the pendulum mass support (12), the rolling element (28) having a first outer diameter (37) in a first section (34) located within the recess (32) of the pendulum mass support (12) and a second outer diameter (41) in a second section (42) located within the recess (32) of the pendulum mass (20);
wherein the rolling element (28) has a third section (46):
axially located between the first and second portions;
not located in the first or second recess; and,
having a third outer diameter (48), the third diameter being smaller than the first outer diameter (37).

* * * * *